Jan. 15, 1957 A. SMITH ET AL 2,777,272
UNDER-TREE MOWER AND HARVESTER
Filed Oct. 26, 1955 2 Sheets-Sheet 1
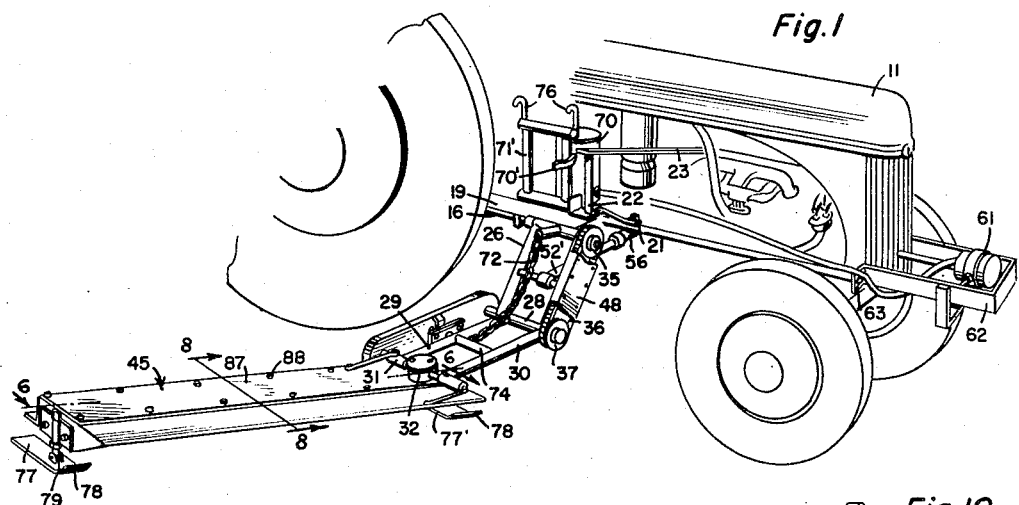
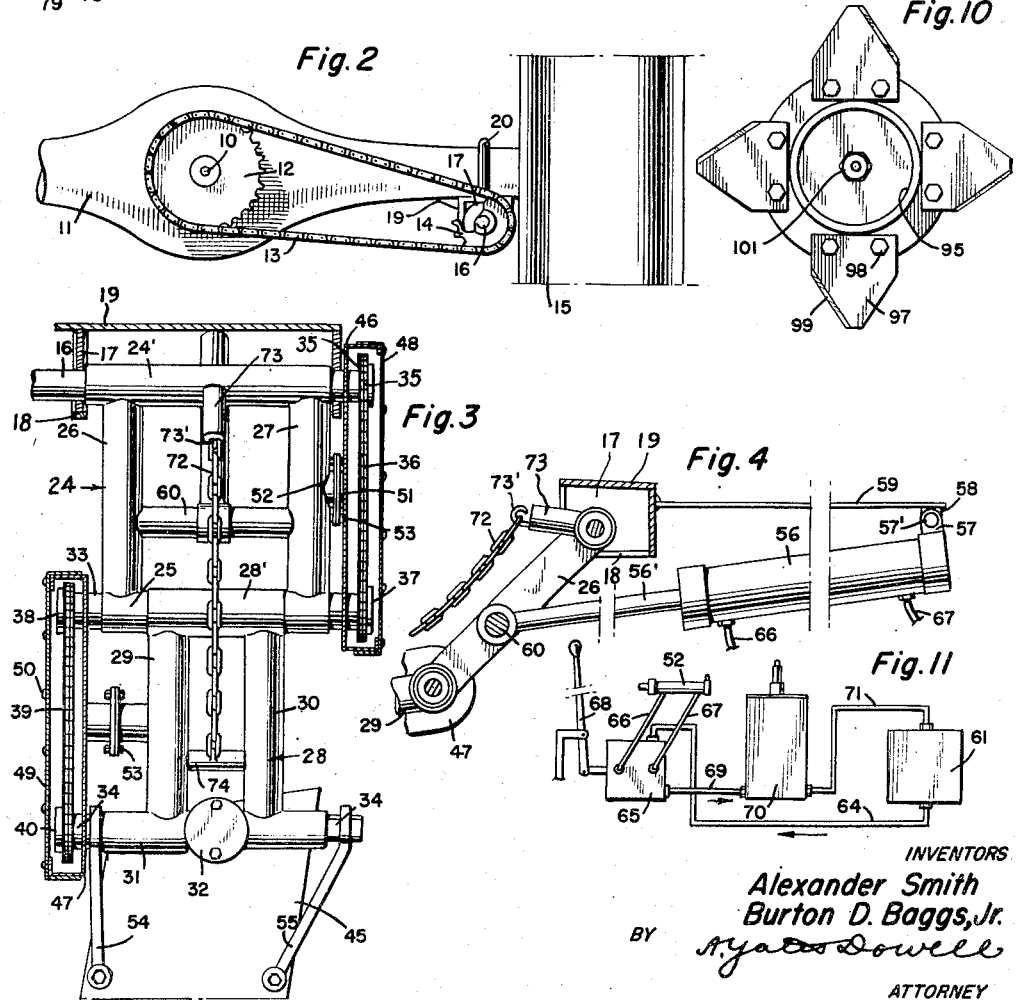
INVENTORS
Alexander Smith
Burton D. Baggs, Jr.
BY
ATTORNEY Jan. 15, 1957 A. SMITH ET AL 2,777,272
UNDER-TREE MOWER AND HARVESTER
Filed Oct. 26, 1955 2 Sheets-Sheet 2
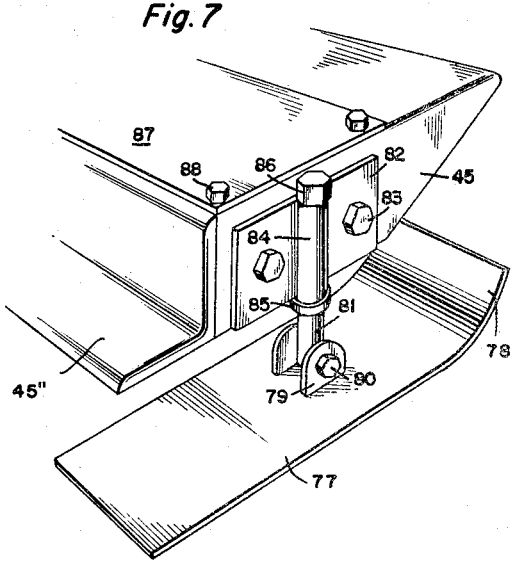
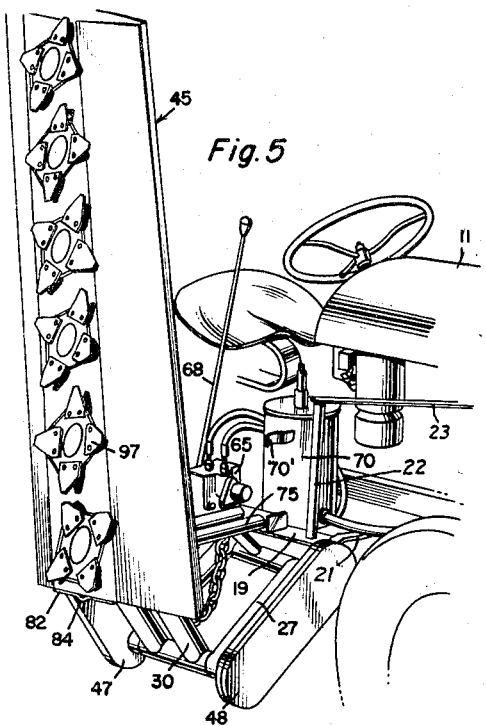
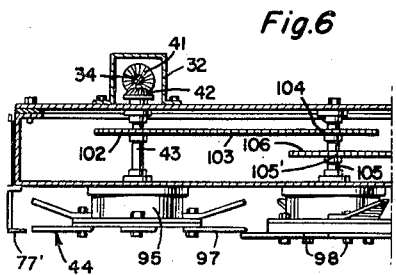
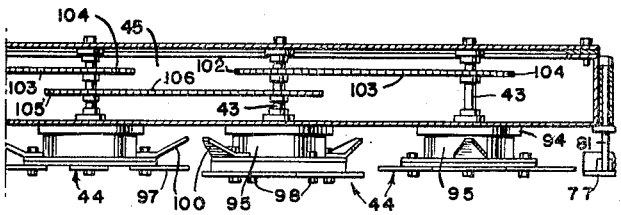
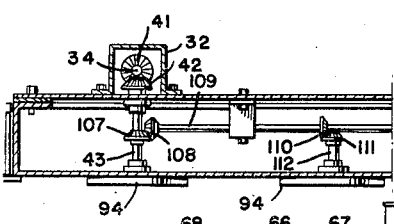
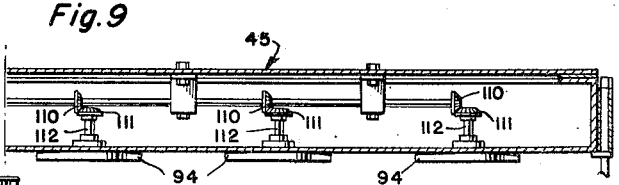
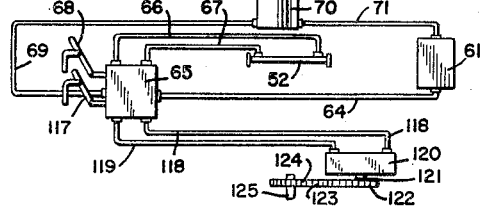
INVENTORS
ALEXANDER SMITH
BURTON D. BAGGS, JR.
BY A. Yates Dowell
ATTORNEY

United States Patent Office 2,777,272
Patented Jan. 15, 1957

2,777,272

UNDER-TREE MOWER AND HARVESTER

Alexander Smith and Burton D. Baggs, Jr., Sanford, Fla.

Application October 26, 1955, Serial No. 542,897

14 Claims. (Cl. 56—25.4)

This invention relates to the care and cultivation of plant life including the cutting and harvesting thereof and the digging in the soil to destroy certain injurious substances such as acids and the like and to facilitate growth. More particularly the invention relates to equipment employed on farms, in citrus and other groves and the like where mowing and cultivation is desirable and consequently is carried on extensively.

The invention relates specifically to power-driven mowers and cultivators by means of which it is possible for an operator to do a great amount of work and substantially more than he normally could perform and including among other things the treatment of relatively large areas under trees and elsewhere with minimum effort and expense.

In areas where citrus fruits and other products are grown the limbs, and especially those weighted by fruit and hanging low and substantially reaching the earth, frequently present a substantial problem when mowing and cultivating, it being a problem to do the necessary work and at the same time avoid injury to the trees and to the fruit. This has resulted in mowing being neglected and cultivation being carried on at a minimum, the grass and soil beneath the trees being left untouched although needing attention.

Mowers and cultivators have not been able to mow the growth and cultivate the soil beneath the low hanging branches of citrus and other trees in order to reduce the acidity as well as pests and generally to promote the welfare of the tree, the yield of fruit, and for other reasons, as well as to mow and cultivate beneath and around other fixed objects and obstructions.

Accordingly, it is an object of the invention to provide an under-tree mower and cultivator which can operate either while traveling in one general direction or in a circular path, which has an operating cutter arm or bar which can be projected, retracted, raised and lowered when used under and around trees and other objects, which will accommodate itself to the surface of the land to which it is applied in order that mowing and cultivation can be accomplished without forceful contact and resultant injury to a tree or other obstruction or to the machinery as well as a machine of this character capable of performing the greatest amount of work with minimum effort and expense.

Another object of the invention is to provide a cultivator attachment for a conventional tractor by means of which harvesting or mowing and cultivation can be carried on with the machine traveling in a straight line, or in a circle beneath and in close proximity to trees or other relatively low objects and with mechanism which can be extended or projected to treat a substantial area or swath in its travel and which can be quickly retracted to avoid striking the trunk of a tree or other obstruction during such travel.

Another object of the invention is to provide a relatively simple and inexpensive mower and cultivator attachment which can be readily applied to a conventional tractor and driven from the power take-off of such tractor, and with a swept-back cutter bar extending outwardly from the tractor and rearwardly at an angle to the path of movement thereof, and with a series of laterally extending toggle forming pivot members for projecting, retracting, raising and lowering such cutter bar and cutters, and with hydraulic operating means therefor actuated by power supplied from a pump driven by the motor of the tractor.

A further object of the invention is to provide a combination mower and cultivator attachment in the form of a hollow oil tight cutter bar adapted to contain a bath of oil or other lubricant in which cutter bar are disposed a series of relatively short spaced parallel vertical shafts interconnected by sprockets and chains, shafts and gears or other driving mechanism operating in oil and with the lower ends of such vertical shafts located beneath the cutter bar and having rotary cutters fixed to each and adapted to operate in substantially the same plane, alternate cutters being slightly offset so that the blades of the cutters may overlap and with such cutter bar having slighly inclined forward and rear edge portions so that it may easily travel along the surface of the ground.

Another object of the invention is to provide a skid, shoe or support for each end of the cutter bar so that it will be spaced above the surface of the ground for mowing and a mounting for the cutter bar including pivotally connected frames, one pivoted to a tractor and pivotally supporting the second, which in turn pivotally supports the cutter bar so that it may be projected and retracted and raised and lowered, and with hydraulically operated means for swinging such pivoted frames.

A still further object of the invention is to provide an under-tree mower and cultivator which can be projected and retracted, which sweeps back rearwardly from its forward end to a position adjacent the rear axle of the tractor on which it is mounted to permit circular operation, with inexpensive cutter blades which may be discarded and replaced when dull and which blades although guarded by the front and rear edges of the cutter bar will tend to burrow a slight amount into the soil instead of rolling or otherwise travelling over the surface thereof, and with each cutter having a pair of diametrically spaced additional or auxiliary blades and an annular weed ring to prevent the collection of vines, weeds, or the like, around the shaft of the cutter to interfere with the operation thereof, as well as a device which with the cutter bar supported by skids can be used as a mower but by removal of the skids the machine can be used as a cultivator, and by replacing the skids on its opposite ends the machine can again be used as a mower.

Another object of the invention is to provide a hollow cutter bar with a removable top and in which hollow cutter bar the bearings are all easily accessible and removably carried instead of having a separate cover for each bearing making accessibility more difficult and time consuming.

Further objects and advantages of the invention will be apparent from the following description taken in conjunction with the accompanying drawings, wherein:

Fig. 1 is a perspective illustrating one application of the invention;

Fig. 2, a fragmentary rear elevation disclosing the power take off;

Fig. 3, an enlarged fragmentary top plan view of the linkage which mounts the cutter bar;

Fig. 4, an enlarged side elevation of the hydraulic operating cylinder and piston and the mounting of the same;

Fig. 5, a perspective with the cutter bar in raised position;

Fig. 6, a longitudinal vertical section through the cutter bar taken on the line 6—6 of Fig. 1;

Fig. 7, an enlarged perspective of the end of the cutter bar and its removable supporting skid;

Fig. 8, a transverse vertical section through the cutter bar taken on the line 8—8 of Fig. 1;

Fig. 9, a longitudinal vertical section similar to that of Fig. 6 of a modified cutter bar with a gear drive instead of a chain drive as in Fig. 6;

Fig. 10, a bottom plan view of one of the cutters;

Fig. 11, a diagram of the hydraulic system; and

Fig. 12, a diagrammatic view of a hydraulic system for driving the cutters.

Briefly stated the invention comprises an elongated mower hoe structure or a cutter for mounting upon and deriving its power from a vehicle such as a conventional tractor, the mounting being at an acute angle to the longitudinal axis of the cutter to enable travel in a relatively small circle with its outer end substantially stationary and the mounting including a pair of links each in the form of an elongated frame and with such frames hinged together and one hinged to the vehicle and the other to the mower hoe unit so that the latter may be retracted to avoid striking a tree or other obstruction.

Upon the rearwardly extending power take-off 10 (Fig. 2) of the tractor 11 there is mounted a sprocket 12, which drives a transversely disposed chain 13, and a second sprocket 14 in the plane of the first near the right-hand wheel 15 of the tractor 11. The sprocket 14 is fixed to a forwardly extending drive shaft 16 mounted in spaced bearings 17, one adjacent each end, and which bearings are encased by an L-shape brace 18 having horizontal and vertical arms in contact with the horizontal and vertically disposed portions of an angle iron auxiliary frame 19 disposed in parallel relation to such forwardly extending shaft.

The horizontal portion of the auxiliary frame 19 is located beneath the rear axle of the tractor and secured thereto by means of one or more U-bolts 20. This forwardly extending angle iron auxiliary frame is relatively heavy in order to provide the main support for the combination mower and cultivator.

At its forward end the auxiliary frame 19 is connected by means of a brace 21 with the bottom of the motor, and by means of an upright post 22 and an additional brace 23 it is connected to the top of the motor as shown in Fig. 1. The forwardly extending shaft 16 preferably has a bearing 17, at each end and in its intermediate portion, for strength.

A pair of substantially rectangular pipe frames provide linkage and a support for a cutter bar which sweeps back or extends rearwardly at an angle from its end nearest to the tractor just ahead of the front wheels, its opposite end being disposed in line with the rear axle of the tractor. The rectangular frame 24 nearest the tractor has ends 24' and 25 and sides 26 and 27 with its end 24' receiving the forwardly extending drive shaft 16 beneath the angle iron auxiliary frame 19 so that it can pivot about such shaft. Its lower end 25 forms a pivot for the end member 28' of a second rectangular frame 28 having sides 29 and 30 and the outer end of the second frame includes end members 31 connected to a gear box 32 having a removable cover. On the inside of the telescoping members 25 and 28' is disposed a shaft 33, and within the end member 31 is disposed a shaft 34.

In order to transmit driving force the first or drive shaft 16 has fixed thereto a sprocket 35 (Figs. 1 and 3) which drives a chain 36 and a sprocket 37 on the end of the second shaft 33. On the opposite end of the shaft 33 is fixed a sprocket 38 which drives a chain 39 and a sprocket 40 on the end of the shaft 34 having a bevelled gear 41 (Fig. 6) for driving a second bevelled gear 42 on a short vertical shaft 43 on the lower end of which is mounted the first of a series of cutters 44 carried by the cutter bar 45. The bevelled gears 41 and 42 are located in a gear box 32 with a removable top.

The chains 36 and 39 are located at opposite sides of the rectangular frames and preferably are provided with housings 46 and 47 and removable covers 48 and 49 held in place by bolts 50. A brace member 51 joins the housing 46 and a second brace member 52 is attached to the side 27 of the first rectangular frame. These brace members are connected by removable bolts 53. Similar bracing is preferably provided for the housing 47. A pair of small braces 54 and 55 connect the shaft 34 to the inner end of the cutter bar.

In order to extend and retract the pivoted frames a hydraulic cylinder 56 (Figs. 1 and 4) is provided, one end 57 of which is connected by a pivot 57' to the depending eye 58 of a transverse bracket 59 attached to the angle iron auxiliary frame member 19. The piston 56' of the hydraulic cylinder is connected to a cross member 60 in the first rectangular frame between and carried by the side members 26 and 27 in spaced relation to the shaft 16 on which such frame is mounted. Since the remote end of the hydraulic cylinder is pivoted at the opposite side of the motor on the eye 58, when hydraulic fluid is supplied to the cylinder on the remote side of the piston from the pivoted rectangular frame members the piston will move the bar 60 and its frame outwardly or it will be extended, and when hydraulic fluid is applied to the side of the piston nearer the rectangular frame members retraction will occur. The length of the first rectangular frame member, and consequently retraction is determined by the clearance beneath and consequently the height of the tractor frame.

In order to supply hydraulic fluid under pressure (Fig. 1) a pump 61 is mounted in a bracket 62 secured by bolts 63 to the front of the tractor frame in a manner to be driven from the crank shaft of the motor of the vehicle. This pump forces hydraulic fluid through a line 64 (Fig. 11) to a control valve 65, from which, in accordance with the position of the valve, fluid may be supplied through lines 66 and 67 to the opposite sides of the piston in the hydraulic cylinder. The operation of the valve is controlled by a hand lever 68 accessible to the operator of the tractor. When the valve-operating lever 68 is in neutral position fluid from the pump 61 through the pressure line 64 to the valve can travel through an additional fluid line 69 to a reservoir 70, and from such reservoir through another line 71 back to the pump. Thus, the position of the cutter bar, with its series of spaced cutters may be controlled by the operation of the lever which controls the hydraulic valve.

A chain 72 is provided having one end detachably mounted by means of a hook 73' to a support 73 fixed on the end member 24' and the opposite end of the chain permanently attached to a cross bar 74 fixed between the side members 29 and 30 of frame 28. This chain controls the extension of the frames and when fully extended causes the frames to pivot about shaft 16 so as to be almost but not quite fully extended in a straight line. When the rectangular frames are extended as far as chain 72 will allow, the cutter bar 45 will be elevated to substantially the height of the chassis of the tractor to clear an obstruction such as a large rock or tree stump. The cutter bar also may be raised to cut at some elevation above the ground line. The construction employed permits the cutter bar carried by the outer end of the rectangular frame 28 to accommodate itself to the contour of the terrain.

To raise the cutter bar to a vertical or traveling position retract the cutter bar as far as possible, disengage chain 72 from hook 73', stretch chain tight and engage the hook with as short a length of chain as possible to form a triangle having the frames 24 and 28 as two sides of the triangle and chain 72 as the third side. When the hydraulic piston 56' is extended the chain will cause the cutter bar and the frames 24 and 28 to pivot around the shaft 16 and raise the cutter bar to a vertical position.

In order to maintain the cutter bar in elevated position, a rectangular frame 75 is provided having a pair of hooks 76 such frame 75 being pivoted on the angle iron mounting bar 19 and are adapted to be maintained in upright position by a latch 76' when they are not in use but to be swung downwardly where they will extend around the end member 31 of the outer rectangular frame.

The cutter bar is provided with a pair of skids or shoes 77 and 77' one on each end which maintain it spaced slightly above the terrain for mowing. This cutting mechanism includes a weed ring 94 attached to the bottom of the cutter bar 45 by any suitable means as for instance tack welding and being substantially L shape in cross-section for preventing weeds or growth from entering the joint between the base of an inverted cutter support 95 having an annular flange 96 (Fig. 10) to which a series, for example four, conventional cutters 97 are secured by bolts 98, such cutters having sharpened edges 99, and which cutters when dull are adapted to be discarded and replaced since they are relatively inexpensive. The bolts 98 extend through the annular flange 96 and secure the cutter blades thereto. A pair of diametrically disposed additional cutters 100 are secured in position by means of the same bolts 98, such additional cutters having upwardly extending angular cutting portions to prevent the accumulation of vines, or other growth around the supporting member 95. The cutter support is held in position on the lower end of the shaft 43 by means of a nut 101.

The cutter bar is intended to have a series of rotary cutter units like that just described and as shown (Fig. 6) the shaft 43 may be provided with a sprocket 102 which drives a chain 103 and in turn an additional sprocket 104 on a shaft 105, such shaft corresponding to the shaft 43 except its upper end terminates beneath the under side of the cover 87 of the cutter bar. From this shaft, by means of a sprocket 105' fixed thereon and a chain 106, additional shafts and cutter units at their lower ends can be driven. For more satisfactory operation alternate cutters should be slightly offset vertically so that the cutters can slightly overlap and prevent growth passing therebetween without being cut.

The skids 77 are preferably rectangular with upwardly curved front end portions 78. Spaced mounted bosses 79 (Fig. 7) are provided for receiving a bolt 80 which forms a pivot for the lower end of a rotatably mounted supporting shaft 81 secured to the cutter arm 45 by means of a bracket or plate 82 and bolts 83. The plate 82 has an enlarged shaft-receiving portion 84 and the shaft is provided with projections 85 and 86 which limit its endwise movement. Thus each skid may pivot on the bolt 80 and on the shaft 81 at right angles thereto which amounts in effect to universal movement. The skids are adapted to be applied when the device is used for mowing and removed as shown in Fig. 5 when it is used for cultivating.

Referring to Fig. 6, the shaft 43 is driven from shaft 34 by means of the bevel gears 41 and 42. This shaft 43 is mounted in the cutter bar 45 and which includes a removable cover 87 held in place by bolts 88. In order to mount the shaft 43 bearings 89 are located within the hollow cutter bar at opposite ends of the shaft and within retaining annular ribs 90 and 91. The shaft 43 has a shoulder 92 adjacent its lower end so that such shoulder can rest upon the bottom wall 93' of the chamber 93 within the cutter head 45. The walls which form the chamber are preferably integral except for the removable top in order to provide strength for the cutter bar. The lower end of the shaft 43 extends downwardly through the bottom wall of the cutter bar and supports the cutting mechanism thereon. Instead of driving the cutter shafts by means of sprockets and chains they may be driven, see Fig. 9, by the bevel gear 107 on the shaft 45 which in turn drives the bevel gear 108 on the horizontal shaft 109 from which any desired additional number of cutters may be driven by additional gears 110 and 111 and stub shafts 112.

Sprockets between the power take-off and the driven shaft of the proper sizes are used to provide the proper speeds of the cutters for mowing and harvesting. Rotation of the cutters is at high speed for mowing and at lower speed for cultivating or hoeing.

It will be apparent that the cutter bar is of such construction that the cutters are located along the center and guarded since at each side of the channel member of the cutter bar there is disposed a member providing a guard, the one on the front of the cutter bar providing an angular surface 45' to cause growth to pass beneath the bar to the cutters, and the one on the rear or angle iron guard 45" preventing the cutters from injuring either the person or property.

The cutters may be driven from the power taken off a tractor by means of the shaft, sprocket, and chains, illustrated and described. If desired these cutters may be driven by a hydraulic drive means. Accordingly in Figure 12, there is disclosed a system illustrating such an arrangement wherein the pump 61 supplies hydraulic fluid through a line 64, to a control valve unit 65, having two four-way valves from which hydraulic fluid can be supplied to the hydraulic cylinder 52, through the lines 66 and 67, as previously described. The control of fluid through such lines being by means of a control lever 68, which controls the 4-way valve previously described and with fluid returning by line 69 to a reservoir 70, and through a return line 71 to the pump 61.

The line 64 is adapted to supply fluid from the line 64 to the other 4-way valve of the valve unit 65, which is controlled by the position of a control lever 117, and through lines 118 and 119 to a hydraulic motor 120, connected to drive a shaft 121 and a 10-tooth sprocket 122, which by means of a chain 123 is adapted to drive a 30-tooth sprocket 124 on a cutter shaft 125, similar to the cutter shaft 43. By operation of the control lever 117, fluid can be made to flow through the line 118 to the hydraulic motor 120 and return through the line 119 to the valve 65. By shifting the valve by means of the operating lever 117 the flow can be changed to reverse the direction of rotation of the cutters. The reverse rotation of the cutters makes it possible to effectively use two cutting edges on each blade 97, thus one edge of each blade is used when the cutters rotate in a counter-clockwise direction. This change in direction of rotation also serves to sharpen the unused edge of the blade by the wiping action on vegetation and any obstructions encountered by honing action. As is well known in the art, the valve controlled by levers 68 and 117 are of the 4-way type allowing hydraulic fluid to return to the reservoir 70 through line 69, and a conventional safety by-pass (not shown) in the system prevents excessive pressures being built up in the system regardless of the condition of the valves controlled by levers 68 and 117 in valve unit 65. It will be evident that valve unit 65 will be conveniently located on the tractor so that the operator may readily control the position of the mower and the rotation of the cutter blades.

It will be obvious to those skilled in the art that various changes may be made in the invention without departing from the spirit and the scope thereof and therefore the invention is not limited by that which is shown in the drawings and described in the specification but only as indicated in the appended claims.

What is claimed is:

1. A mower adapted to be mounted upon a vehicle having a power plant for driving the same comprising a support, a first frame pivoted to said support and swingable from a depending to substantially horizontal position, a second frame pivoted to the outer end of the first frame and swingable from a position near the first frame to a position outwardly therefrom, a cutter bar pivotally connected to the end of the second frame remote from the first frame, means for the transmission of power from said vehicle to said cutter bar comprising a drive-shaft carried by said support and having an axis concentric with that of the mounting pivot of the first frame, a driven shaft parallel to the first shaft and concentric with the pivot connecting the first and second frames, chain and sprocket means driving the second shaft from the first, a third shaft parallel to and driven from the second shaft, said third shaft having a bevelled gear on its inner end, a second bevelled gear at right angles to and driven from the first, a depending cutter shaft driven from said second bevelled gear, a rotary cutter on the lower end of said depending cutter shaft, a series of cutters spaced along and in substantially parallel relation to the lower surface of said cutter bar and driven from the first cutter shaft, and power means for moving said frames relative to each other to raise, lower, project, and retract said cutter bar, said power means including a pump driven from said power plant, a control valve, a hydraulic cylinder, a piston in said cylinder, a pressure line from said pump to said control valve and from said control valve to said hydraulic cylinder at opposite sides of the piston thereof, a piston rod connecting said piston with the first frame for swinging the same upon the movement of said piston, and a relief line from said control valve to said pump.

2. A mower adapted to be mounted upon a vehicle having a power plant for driving the same comprising a support, a first frame pivoted on said support and swingable from a depending to a substantially horizontal position, a second frame pivoted on the outer end of the first frame and swingable from a position near the first frame to a position outwardly therefrom, a cutter bar pivotally connected to the second frame, means for the transmission of power from said vehicle to said cutter bar comprising a drive-shaft mounted on said support and having an axis concentric with that of the mounting pivot of the first frame, a driven shaft parallel to the first shaft and concentric with the pivot connecting the first and second frames, means driving the second shaft from the first, a third shaft parallel to and driven from the second shaft, said third shaft having a bevelled gear on its inner end and a second bevelled gear at right angles to the first, a depending cutter shaft fixed to said second bevelled gear, a rotary cutter on the lower end of said depending cutter shaft, a series of cutters spaced along and in parallel relation to the lower surface of said cutter bar and driven from the first cutter shaft, power means for moving said frames relative to each other to raise, lower, project, and retract said cutter bar, said power means including a pump driven from the power plant of the vehicle, a control valve, a hydraulic cylinder, a piston in said cylinder, lines for hydraulic fluid from said pump to said control valve and from said control valve to said hydraulic cylinder at opposite sides of the piston thereof, a piston rod connecting said piston and first frame for swinging the latter upon the movement of said piston, a reservoir for hydraulic fluid, and a relief line from said control valve to said reservoir for hydraulic fluid and back to said pump.

3. For use with a tractor including a frame, a rear axle, a pair of rear driving wheels and a power plant, a forwardly extending supporting bar for attachment to said tractor beside one of said rear wheels, a shaft mounted along said supporting bar, a member pivoted on said shaft and extending outwardly in front of said rear wheels, a second member pivoted to the outer end and extending outwardly beyond said first member, a cutter bar pivoted to the outer end of the second member ahead of one of the rear wheels and with its outer end mounted for disposition rearwardly in substantial alignment with said axle in order that the tractor can travel in a relatively small circular path around a fixed object, cutter means carried by said cutter bar and extending substantially to the outer end thereof, and means for driving said cutters and for swinging said members to position said cutter bar, said means receiving its driving power from said tractor.

4. For use with a tractor including a frame a rear axle a pair of rear driving wheels and a power plant, a forwardly extending supporting bar for attachment to said tractor beside one of said rear wheels, a shaft mounted along said supporting bar, a member pivoted on said shaft and extending outwardly in front of said rear wheels, a second member pivoted to the outer end and extending outwardly beyond said first member, a cutter bar pivoted to the outer end of the second member ahead of one of the rear wheels and with its outer end mounted for disposition rearwardly in substantial alignment with said axle in order that the tractor can travel in a relatively small circular path around a fixed object, cutter means carried by said cutter bar and extending substantially to the outer end thereof, and means for driving said cutters and for swinging said members to position said cutter bar, said means receiving its driving power from said tractor, and means for independently controlling the operation and location of said cutters.

5. A mower and hoe unit for attachment to a vehicle having a rear axle, said unit comprising frame structure including a cutter-bar-mounting-portion movable toward and from the earth, an elongated cutter bar hinged to said cutter-bar-mounting-portion in a manner to move toward and from and to follow the contour of the earth over which the cutter travels during which its ends may be disposed at different elevations, rotary cutter means carried by said cutter bar along the same and extending to the outer end thereof, said cutter bar being disposed at an acute angle relative to the longitudinal axis of said vehicle and having its outer end located substantially in line with said axle so that said cutter bar and cutter means can be caused to travel in a substantially circular path with the outer end of said cutter means moving in a relatively small circular path and the opposite end in a substantially larger path whereby said cutter means can be operated closely around a relatively small tree or other obstruction.

6. The invention according to claim 5 in which the outer end of the cutter bar is disposed rearwardly of the inner end thereof.

7. The invention according to claim 5 in which the elongated cutter bar is hinged to the frame structure in a manner to move from a lowered position in which the cutter bar follows the contour of the earth to a raised upright inoperative position.

8. The invention according to claim 5 in which the elongated cutter bar is hinged to the frame structure in a manner to move from a lowered position in which the cutter bar follows the contour of the earth to a raised upright inoperative position, and hydraulic means for raising said cutter bar.

9. The structure of claim 5 having means for moving said cutter bar and cutter means laterally toward and from said vehicle.

10. The invention according to claim 5 in which the mounting of the cutter bar includes a pair of frame structures hinged together with one hinged to said vehicle and the other to said cutter bar.

11. The invention according to claim 5 in which the mounting of the cutter bar includes a pair of frame structures hinged together with one hinged to said vehicle and the other to said cutter bar, and means for driving, outwardly projecting, and for retracting said cutter means.

12. The invention according to claim 5 in which said cutter means and supporting means therefor are constructed to aid in the engagement of said cutter means with the matter cut and to maintain such engagement.

13. The invention set forth in claim 5 in which the unit is mounted on and driven from the power plant of a farm tractor and the cutter bar is mounted on multiple pivoted frames and is swept back with the outer end in line with the axis of the rear axle.

14. The invention set forth in claim 5 in which the unit is mounted on a tractor having a power take off and the drive of said cutter means includes transmission through the hinged portions.

References Cited in the file of this patent

UNITED STATES PATENTS

| | | |
|---|---|---|
| 914,492 | Johnston | Mar. 9, 1909 |
| 969,817 | Weathern | Sept. 13, 1910 |
| 1,397,365 | Cook | Nov. 15, 1921 |
| 2,697,319 | Porter | Dec. 21, 1954 |